Sept. 10, 1940.　　　C. R. EDWARDS　　　2,214,550
TESTING DEVICE FOR WELLS
Filed Aug. 24 1928　　　12 Sheets-Sheet 4
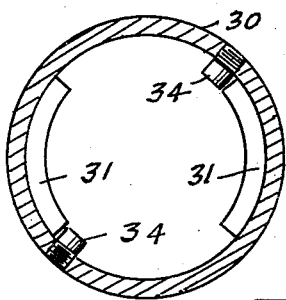
Fig. 9.
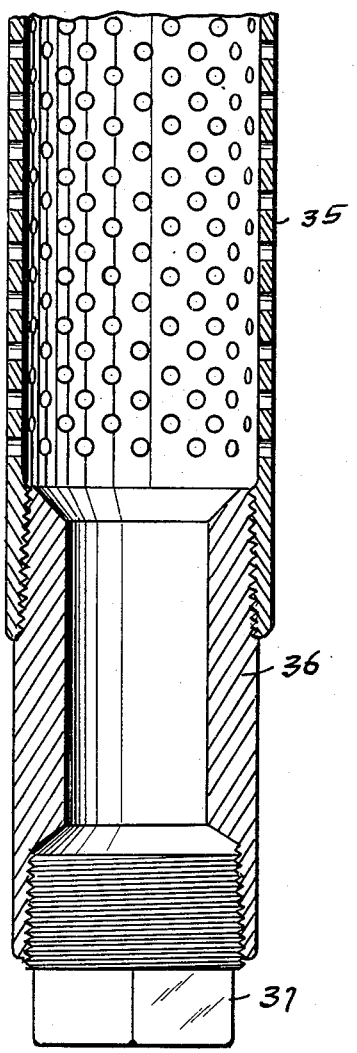
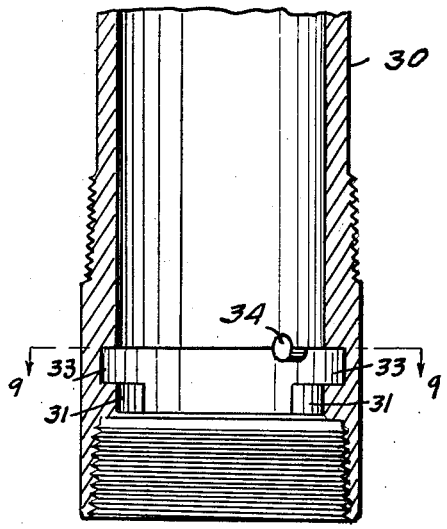
Fig. 8.
Fig. 7.
Charles R. Edwards, Inventor
By Hardway Tatte, Attorney

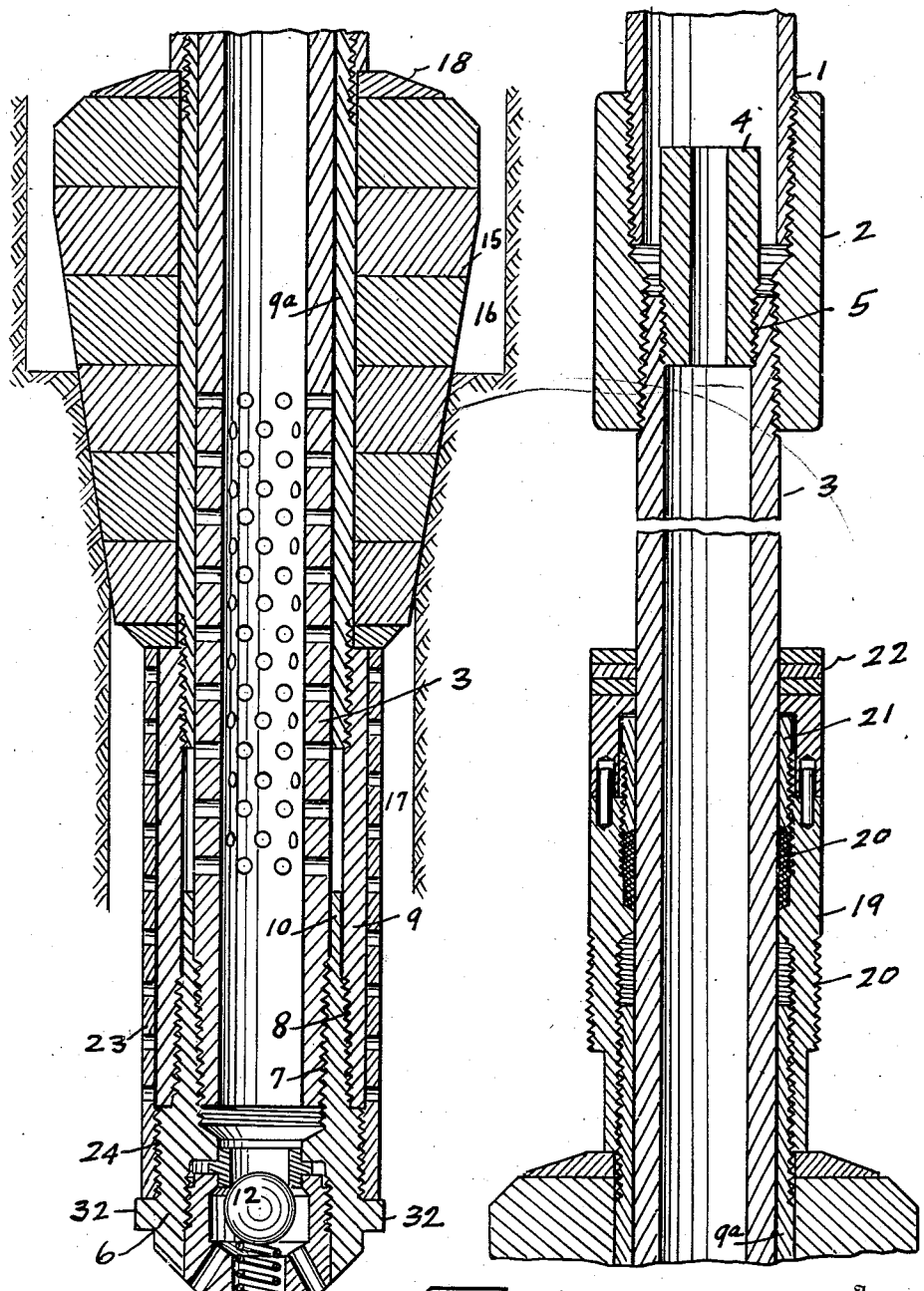

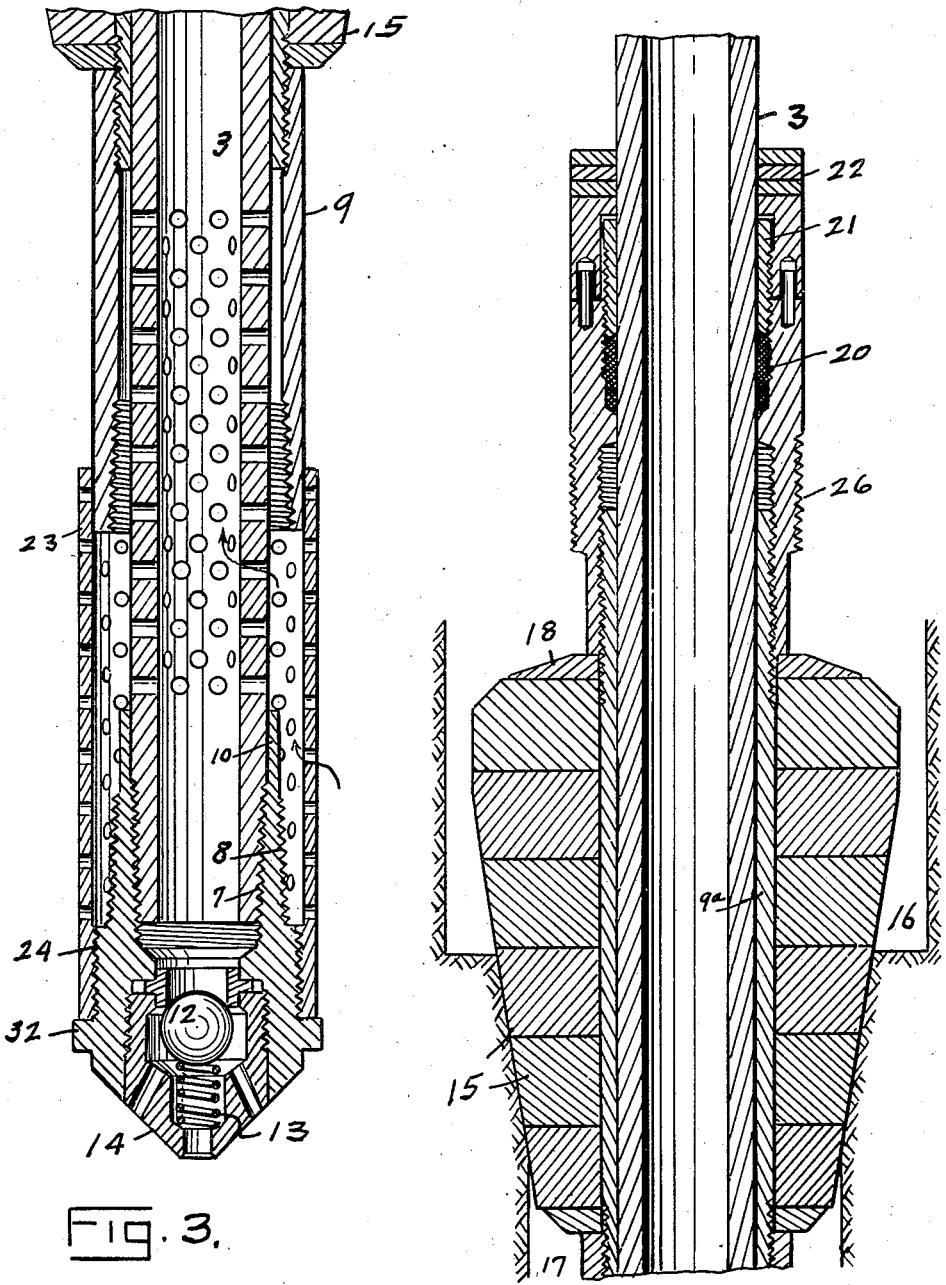

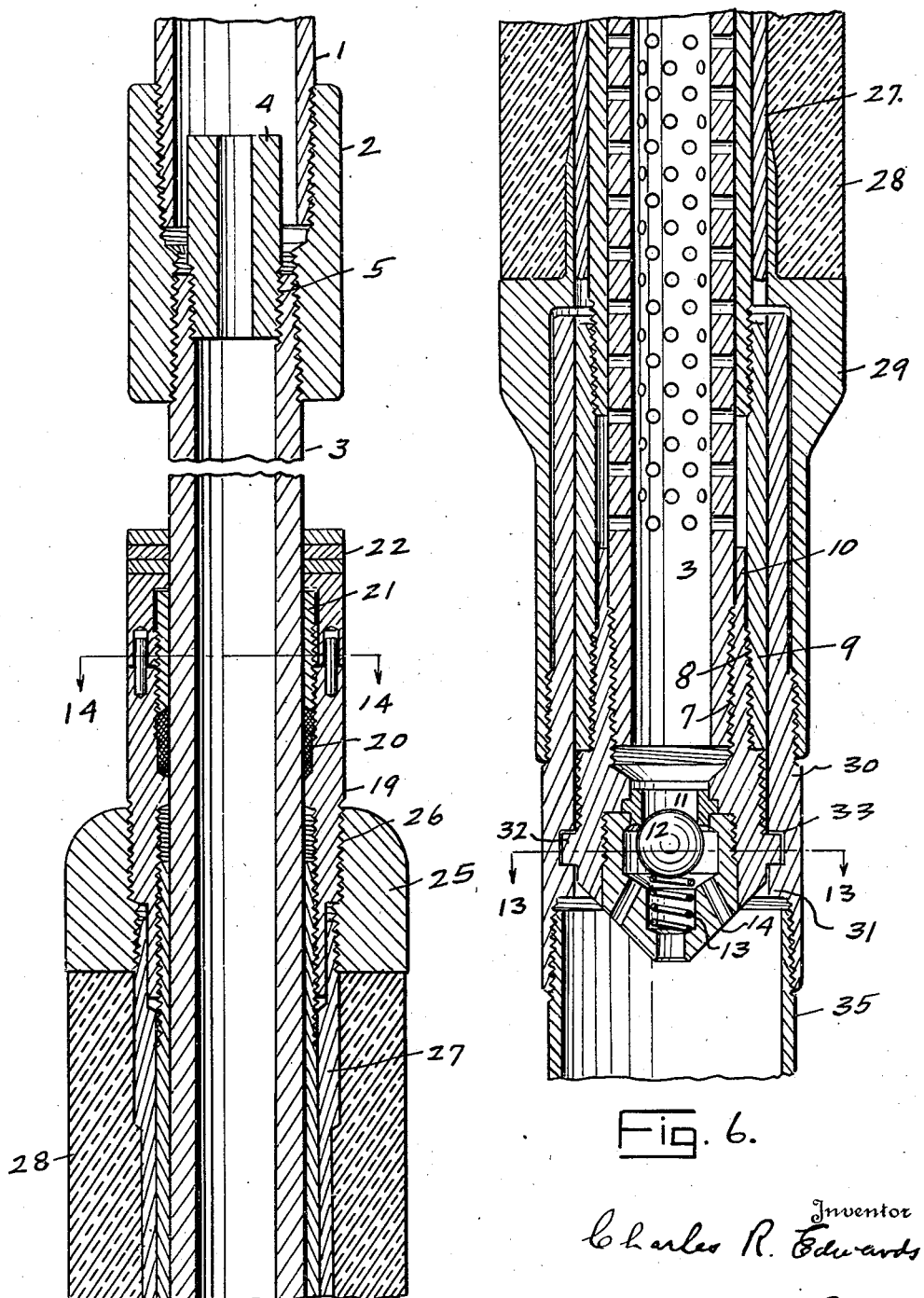

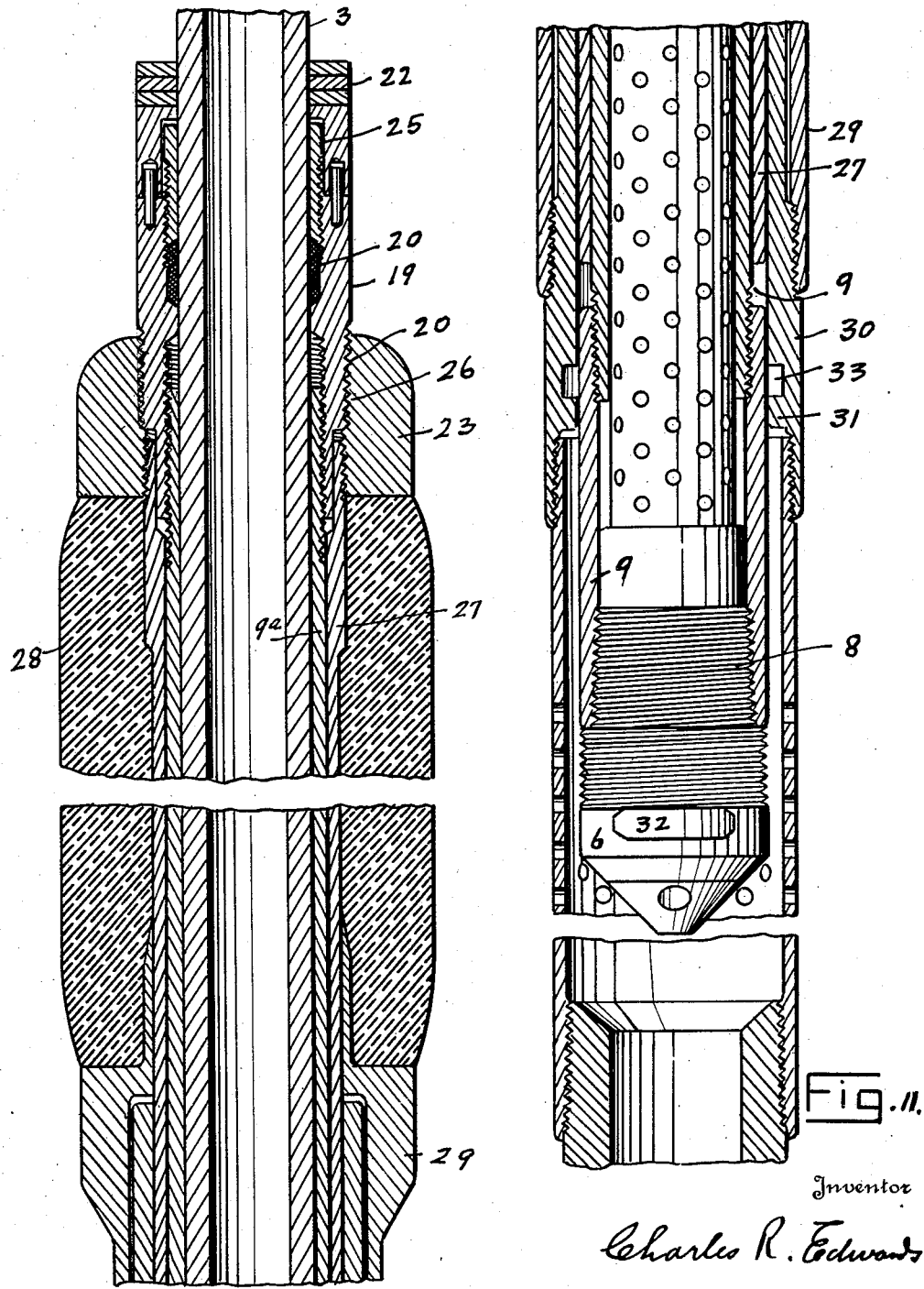

Sept. 10, 1940.　　　　C. R. EDWARDS　　　　2,214,550

TESTING DEVICE FOR WELLS

Filed Aug. 24 1928　　　12 Sheets-Sheet 6

Inventor
Charles R. Edwards
By Hardway Cathey
Attorneys

Sept. 10, 1940.   C. R. EDWARDS   2,214,550
TESTING DEVICE FOR WELLS
Filed Aug. 24 1928   12 Sheets-Sheet 7

Inventor
Charles R. Edwards
By Hardway Cathey
Attorneys

Sept. 10, 1940.  C. R. EDWARDS  2,214,550
TESTING DEVICE FOR WELLS
Filed Aug. 24 1928    12 Sheets-Sheet 8

Inventor
Charles R. Edwards
By Hardway Tarter
Attorneys

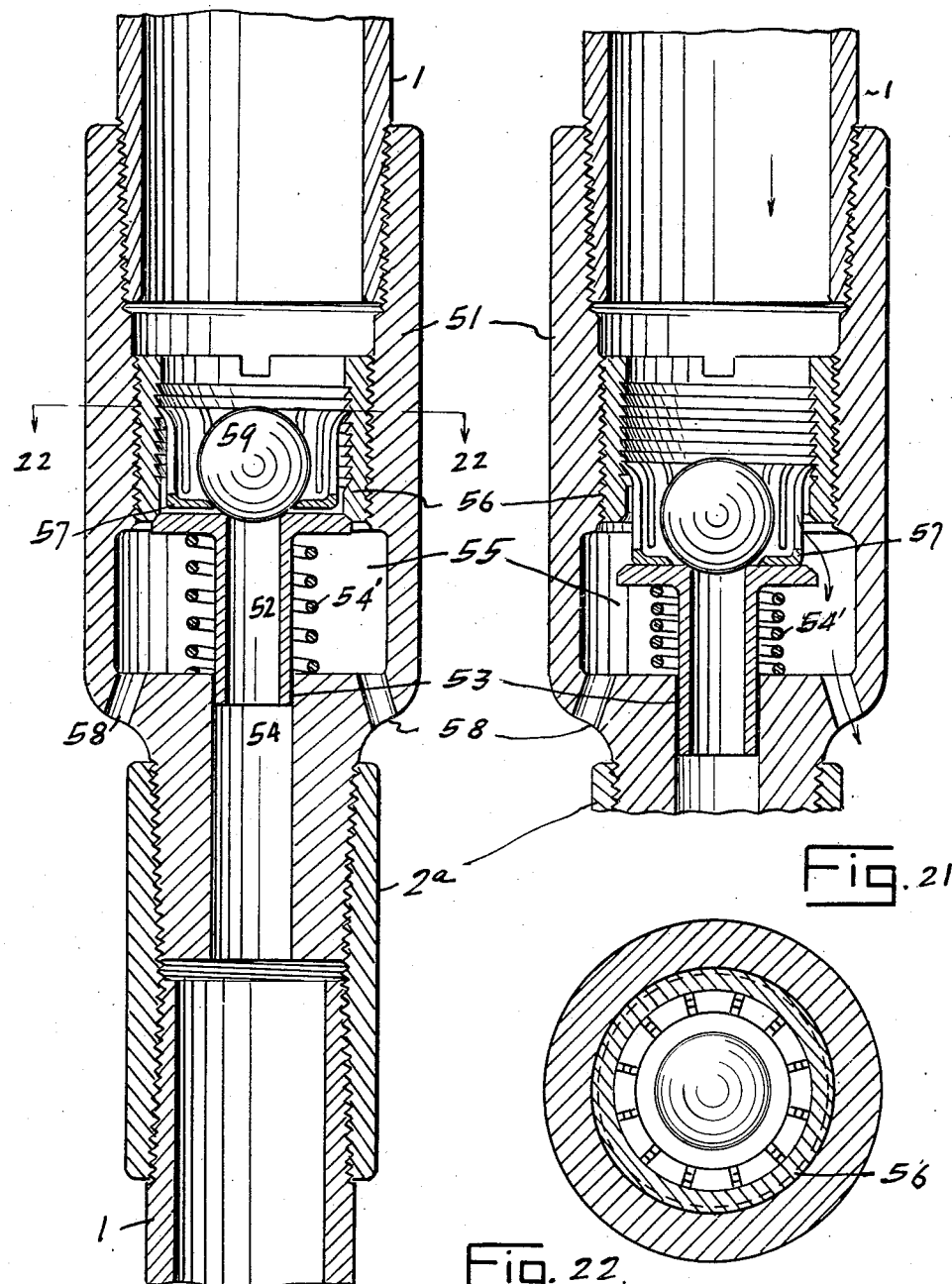

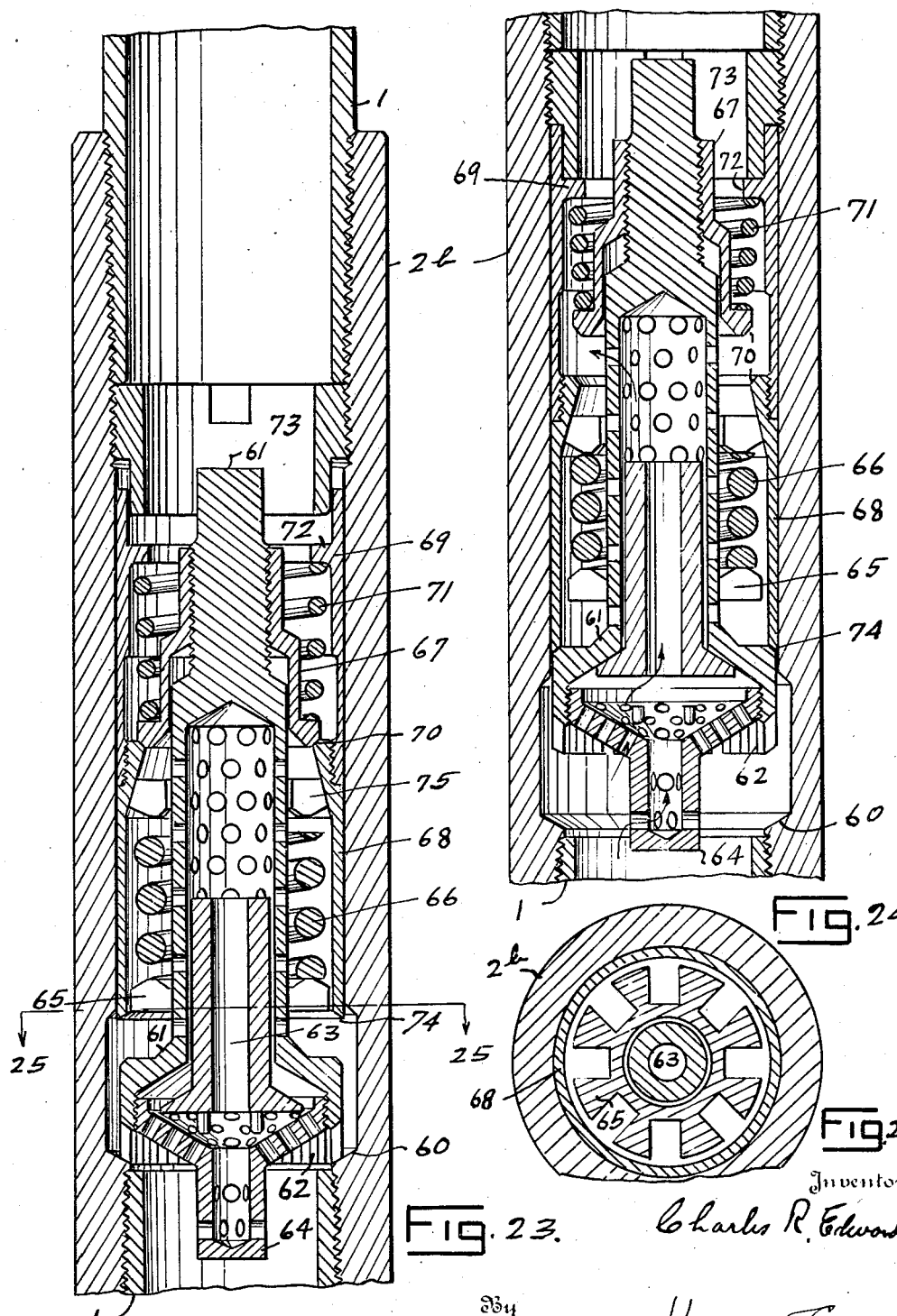

Sept. 10, 1940.   C. R. EDWARDS   2,214,550
TESTING DEVICE FOR WELLS
Filed Aug. 24 1928   12 Sheets-Sheet 11

Inventor
Charles R. Edwards.
By
Hardwey Mather
Attorneys

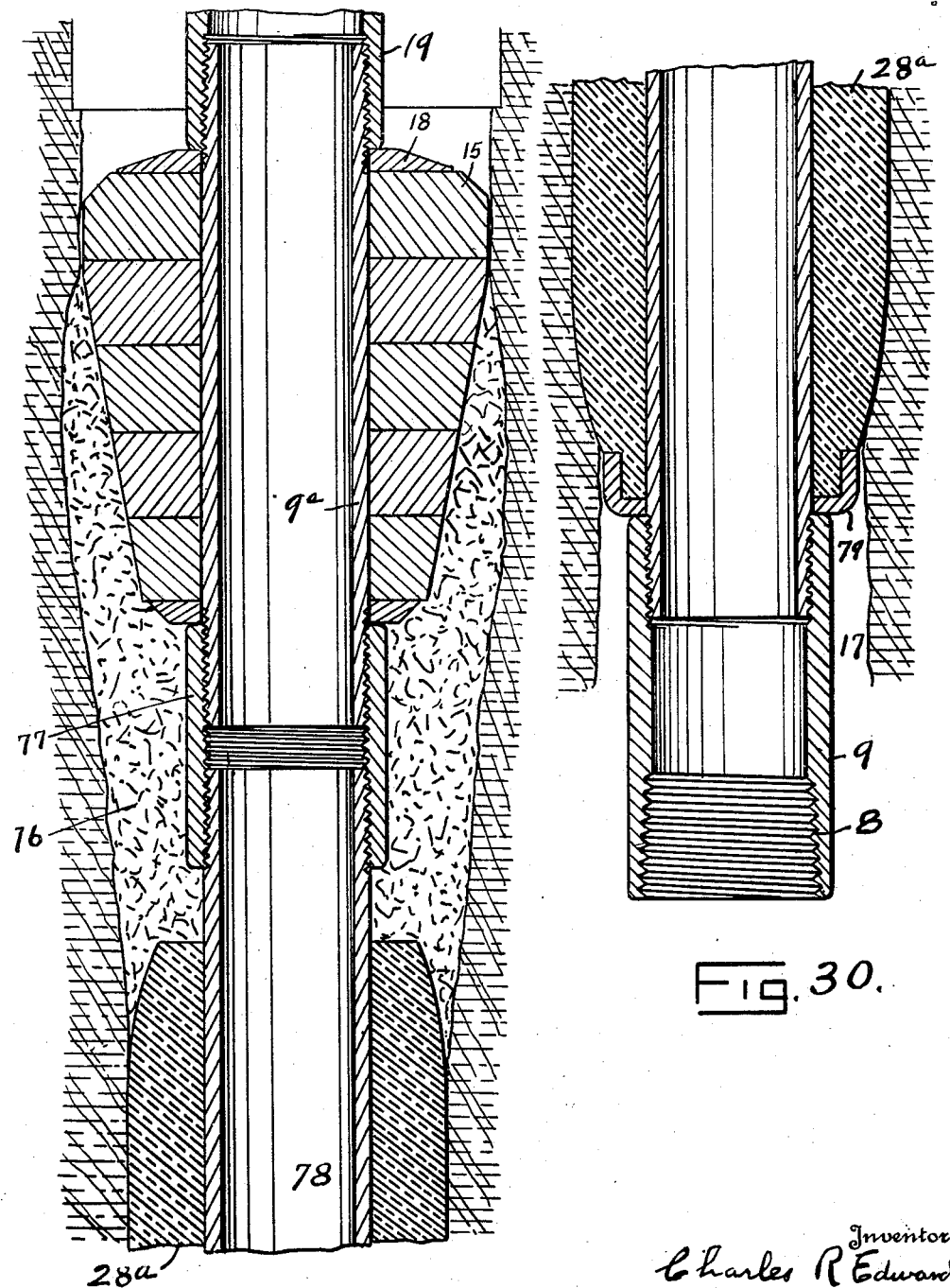

Patented Sept. 10, 1940

2,214,550

UNITED STATES PATENT OFFICE 2,214,550

TESTING DEVICE FOR WELLS

Charles E. Edwards, Houston, Tex., assignor, by direct and mesne assignments, to Houston Engineers, Inc., Houston, Tex., a corporation of Texas Application August 24, 1928, Serial No. 301,762

37 Claims. (Cl. 166—1)

This invention relates to new and useful improvements in a testing device for wells.

One object of this invention is to provide a tester of simple construction and embodying packers of various designs and sizes, and which may be used to test the flow of a stratum or to test the well casing for leaks, at any point in a well bore.

Another object of the invention is to provide a tester with changeable flow beans and also with variable flow beans.

A further object of the invention is to provide a tester having a dump valve providing both a circulation passage and a means whereby the test stem may be emptied back into the well bore so as not to seriously lower the mud laden fluid in the well bore or waste the fluid in the test stem or interfere with the work of withdrawing the tester.

A further feature of the invention is to provide a tester that will not only automatically close when the packer seat gives away, while making a test, but also automatically lock in closed position.

With the above and other objects in view the invention has particular relation to certain novel features of construction, operation, and arrangement of parts, an example of which is given in this specification and illustrated in the accompanying drawings, which however, are merely illustrative of the invention, and wherein:

Figures 1 and 2 show vertical sectional view of the lower and upper parts, respectively of one form of the device shown in the closed position with the ordinary plug packer employed.

Figures 3 and 4 show similar views as Figures 1 and 2 with the device shown open.

Figures 5-6 and 7 show vertical sectional views of upper, intermediate and lower sections of a modified form, of the device in closed position with a special anchor type of packer which is also shown closed.

Figure 8 is a vertical sectional view of the female release member employed.

Figure 9 shows a transverse sectional view thereof taken on the line 9—9 of Figure 8.

Figures 10 and 11 show vertical sectional views of upper and lower sections of the device shown in Figures 5-6 and 7 with the packer shown in set position.

Figure 20 shows a vertical sectional view of one form of the dump valve, in closed position.

Figure 21 is a vertical sectional view thereof shown in open position.

Figure 22 shows a cross sectional view of said valve taken on the line 22—22 of Figure 20.

Figure 23 shows a vertical sectional view of one form of quadruple valve employed, shown in normal closed position.

Figure 24 shows a vertical sectional view of said valve shown in the position it will assume when the flow is excessive in pressure and volume.

Figure 25 shows a cross sectional view taken on the line 25—25 of Figure 23.

Figures 29 and 30 show upper and lower sections of modified form of packing structure employed.

Figure 12:
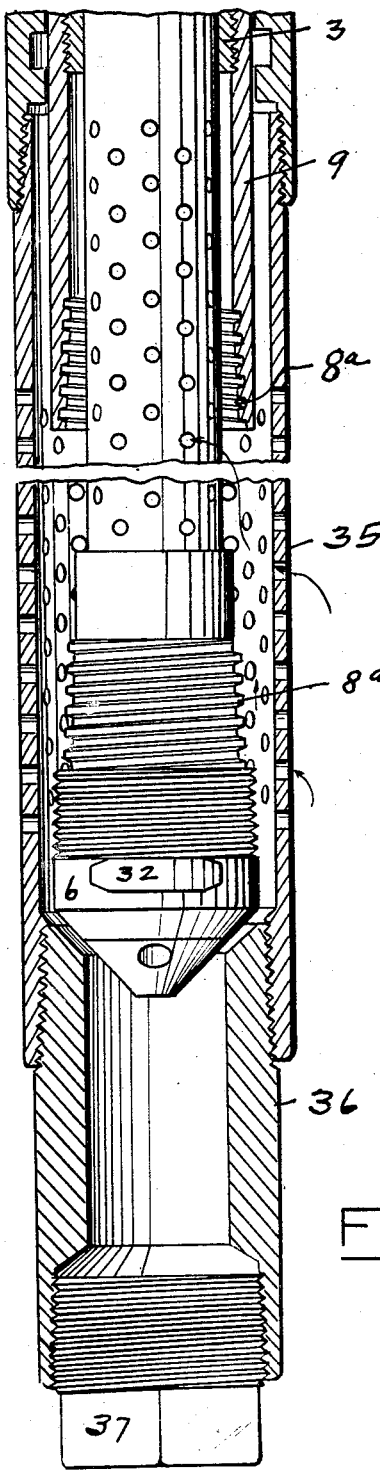
Figure 12 is also a vertical sectional view of the lower end of the device shown in Figures 5-6 and 7 shown in open position and with the packer set.
Figure 14:
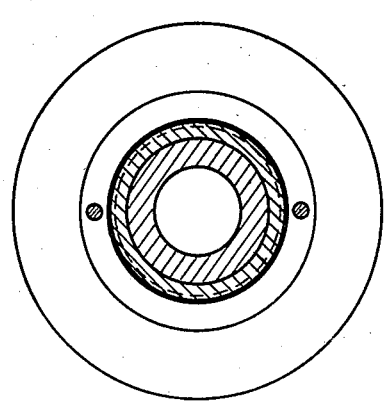
Figure 14 shows a cross sectional view taken on the line 14—14 of Figure 5.

Referring now more particularly to the drawings the numeral 1 refers to the test stem, which may be the usual drill stem used in the rotary system of well drilling or any other suitable stem, and whose lower end section comprises a perforated section 3 which is connected to the upper section of the stem by a coupling 2. There is a simple choker or flow bean 4 which may be anchored in the test stem by threads as at 5 and the bore through this choker may be made of any suitable size or various sized chokers may be used. It being more practical in the stem to use ordinary pipe in some instances the lower end of section 3 may be threaded into the stem plug 6 as at 7. The plug 6 may be externally threaded, as at 8, into the sleeve 9. In such an event a more accurate fit can be made, due to the presence of portion 10, between the plug 6 and the sleeve 9 than is likely to be obtained between the section 3 and the inside of the sleeve 9, if a one-piece fitting were used as portion 10 would then be lacking.

The plug 6 may be fitted with an ordinary and well known back pressure valve mechanism consisting in this instance of an ordinary valve seat 11, a downwardly opening ball 12, a spring 13 of sufficient strength to hold the ball valve 12 so tightly against its seat as to prevent the passage of any fluid either way while going in or coming out or while testing but to seat the ball valve yieldably to such high pressures as can be put up by the powerful mud pumps now employed in the hydraulic rotary drilling process, and a perforated cage 14, to retain the valve and seat in position. The object of the back pressure valve mechanism is only its old purpose and the spring 13 is made extra strong so as to avoid dumping or spilling the sample at all times.

The sleeve 9 may be made of ordinary pipe and in two parts, the part 9a being threaded into part 9.

The seal, or packer, 15 is mounted on the sleeve 9 and may be made in suitable sections so that a packer can be assembled from sections of various sizes and shapes, so as to be used in a variety of different sized bores 16 and core holes or "rat" holes 17. This seal or packer 15 if made of suitable material such as second hand canvas belting can, if caught by an obstruction in the well bore, be stripped off the device thus avoiding sticking the entire device. If such material is used for the packer body a light steel washer 18 may be clamped above it so as to avoid pushing the device downward through such a packer. This washer 18 can be easily bent down if caught on an obstruction while withdrawing the device from the bore.

The gland body 19 may be threaded onto the upper end of the sleeve 9a so as to retain the packer 15 in place. A packing 20 and gland nut 21 (21a—21b in some of the figures) may be used to prevent leakage through the gland body into the device especially if the sleeve 9a and stem 3 should be worn.

Hardened washers as 22 may be mounted above the gland body 19, to prevent excessive wear while rotating with the device fully opened and the weight of stem unsupported.

In some formations it has been found desirable to use the outside screen 23 whose lower end may be secured to the plug 6 by threads at 24. The open position of this form of the device is clearly shown in Figures 3 and 4 wherein the threads 8 have been unscrewed and the stem lowered through the packer, so as to admit fluid from below the packer. In the drilling of oil wells with the rotary system when approaching a depth where pay strata may be expected it is customary in most fields to feel ahead from one formation suitable for a casing seat to some formation suitable for a deeper casing seat. If in this feeling ahead, or "rat holing" as it is usually called, a new stratum is entered the small bit is withdrawn and a core bit used. Where the core is obtained and withdrawn and some question arises as to the fluid contents of the stratum the tester may be run into the bore and an actual sample of the fluid, contained in the stratum or strata pierced, and below the tester seat, be withdrawn and examined.

This may be done by attaching the drill pipe or a stem to the stem 3 of the tester and the stem together with the sleeve, faced with a yieldable facing 15, and this may be lowered to its seat in the well bore as a unit and seated thereon in the usual and well known way for such packers. The stem may be screwed to the right, thus unscrewing it from the sleeve packer and the stem lowered. If there be any pressure of oil, gas or other fluid it will now rush through the perforated section of the stem and up the stem and if there be sufficient pressure of oil, gas or other fluid from the stratum below the packer it will push a stream of the same from the top of the stem. But if the pressure be low, it may be that the fluid will rise only part way to the surface, in such an event it is most obvious that before the device can be withdrawn or before the sleeve like faced packer can be raised from its seat that the stem will be raised back into the sleeve, and positively close the stem before unsealing the well, in fact it can not be done otherwise under normal conditions; first, because the sleeve with its packer facing has been tightly wedged into its seat in the reduced bore in the well in the usual seating act (many drillers "spud" that is, raise and drop this kind of packers, or shoes, as they are sometimes called, to make a fluid tight seal); second, because after the stem is lowered and opened the space below the sealing point is opened to the atmosphere through the stem and the very great weight of the long column of fluid above the packer is on the packer forcing it exceedingly tightly into its seat in the reduced bore, and this is one important reason for making the packer facing so it can be stripped off and avoid sticking the entire device; third, it is most evident that it will thus require a very considerable pull on the stem to lift the sleeve packer out of its seat and thus the stem must be pulled back into the sleeve, and as the sleeve fits over the lower end of the stem, that is, fits stem plug 6, it is obvious a sample will be entrapped if within the stem and withdrawn substantially uncontaminated out through the drilling mud which remained in the well while running in the tester. The main idea of using a tester is to avoid the necessity of setting a permanent casing and bailing out the drilling mud so as to relieve the pressure on any earth fluid that might be present in the stratum below the sealing point in the well bore.

In a few fields "rat holing" ahead is not generally practised and occasionally where "rat holing" is practised some promising sand is encountered while drilling the full sized hole. In such cases "rat hole" tests can not be made and a straight hole tester is needed.

Also it sometimes happens that oil or gas is found in the drilling mud coming from some point above the rat hole or some other point already passed up and to locate such a flow it may be found desirable to use two straight hole packers, with the tester, setting one packer above and the other below the stratum to be tested. This is also of use to locate leaks in a cased well.

The tapered or "rat hole" packer is used perhaps more often than the straight hole packer. It will thus be seen that testers are rather special devices and it is not practical or good business practice to carry the various kinds and different sizes, of testers that may be demanded for use in the many sizes and types of bores and the various wall conditions also require the use of special design at times even requiring the use of packers not heretofore used.

Therefore the following described forms have been designed and by the use of which testers of the sizes and forms desired may be quickly and easily provided by using the proper size of tester and adding suitable parts of the right size as the occasion may demand. For example a straight hole tester may be assembled by removing the tapered packer 15 and the outer screen 23 and by attaching an adapter 25, of suitable size, by the thread 26, to the gland body, and attaching a sub sleeve 27 to the adapter 25 and mounting a hollow cylindrical packer 28 of suitable size and material, around said sub sleeve 27 and the straight hole tester desired is thus provided. The packer sleeve 28 is supported on the sub adapter 29 which is slidably mounted on the sleeve 9. If it be desired the sub sleeve 27 may be dispensed with.

For the purpose of economy it may be of advantage to form the subadapter of two connected parts, the inner part or the adapter base 30, being slidably mounted on the sleeve 9.

Figure 13:
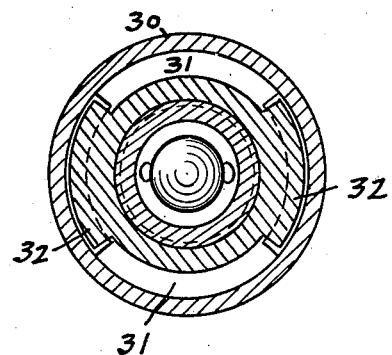
Figure 13 is a cross section of the release member taken on the line 13—13 of Figure 6.

On the inside of the adapter base 30 may be formed the female inwardly facing lugs 31. These may be suitably formed so as to coordinate with the male or outwardly facing lugs 32 which may be formed on the outer periphery of the plug 6. A circular recess 33 is formed above the female lugs 31 and stop pins 34 may be suitably placed so as to assist in interlocking the lugs 31, 32 all as shown in Figures 8, 9 and 13.

Into the lower end of the adapter base a perforated anchor pipe 35 may be threaded. In order to avoid sticking the anchor pipe 35 the lower end thereof may be threaded on the inside and a bushing 36 and a square head plug 37 used to close the lower end of said anchor pipe 35.

In operation, this form of the device, suitably fitted with a packer and packer parts somewhat smaller in diameter than the bore of the well to be tested and with the various parts in the positions shown in Figures 5 and 6, is lowered by the usual equipment to the bottom of the well bore until the plug 37 is firmly seated in the bottom of the bore. The stem 3 is now turned to the right, in this case, until the lugs 32 strike the stop pins 34. The stem and attached parts are now lowered and this lowers the adapter 25 but as the sub adapter 29 is now supported by the bottom of the well bore the packer is set tightly in the well bore, as shown in Figures 10 and 11, sealing the lower part of the well into a separate compartment. Again the drill stem is rotated until the threads 8 are unscrewed and again the stem is lowered, as shown in Figure 12, opening the device so as to permit fluid to enter the stem 3.

After a suitable time the stem and other parts are withdrawn bringing out the entrapped sample.

Obviously the reverse of the above operations could be performed to again make up the threads at 8 before coming out but all that is needed is only to lift the stem. By this action the device is closed by the joint 10 and the packer released and the lugs 33 engage the adapter base 30 and bring out all parts of the device with an entrapped sample. It will be easily observed that when the stem 3 is lifted, after the sample has had an opportunity to enter the stem, that at first no part of the tester will move except the stem and its parts. This is obvious because the weight of the long column of drilling mud in the well bore above the packer is supported solely by the packer in the sealing position until the fit at 10 between plug 6 and sleeve 9 tightly closes the stem 3 against any passage of fluid in either direction. It is also obvious that after the threads at 8 have contacted that all parts of the device will be almost in the positions shown in Figures 10 and 11 except that the stem will be a few threads lower and that most of the tapered threads at 8 will be engaged only by their very tops. Thus it is most obvious that the stem 3 is now closed and the packer is still sealing the well. It is also very obvious that if the stem 3 is lifted further after the threads at 8 have contacted that it will raise the sleeves 9 and 27 and the great weight of fluid above these parts thus relieving the rubber packer facing of a part of its enormous load. Now since rubber is resilient and tends to rebound to its former shape it will be readily observed that the rubber facing will slowly rise and contact letting the mud down slowly around the outside of its top and on down around the outside of the rubber sleeve 28 and on into the lower part of the bore thus unsealing the well and obviously reimposing the mud pressure again upon the stratum tested. It is also obvious that a continued lifting will contact the lugs 31 and 32 or the lugs 31 will contact with the upper surface of recess 33 and all the parts will be withdrawn with the stem and entrapped sample.

A modification of the form of thread 8 is shown at 8a in Figure 12.

Figures 15, 16:
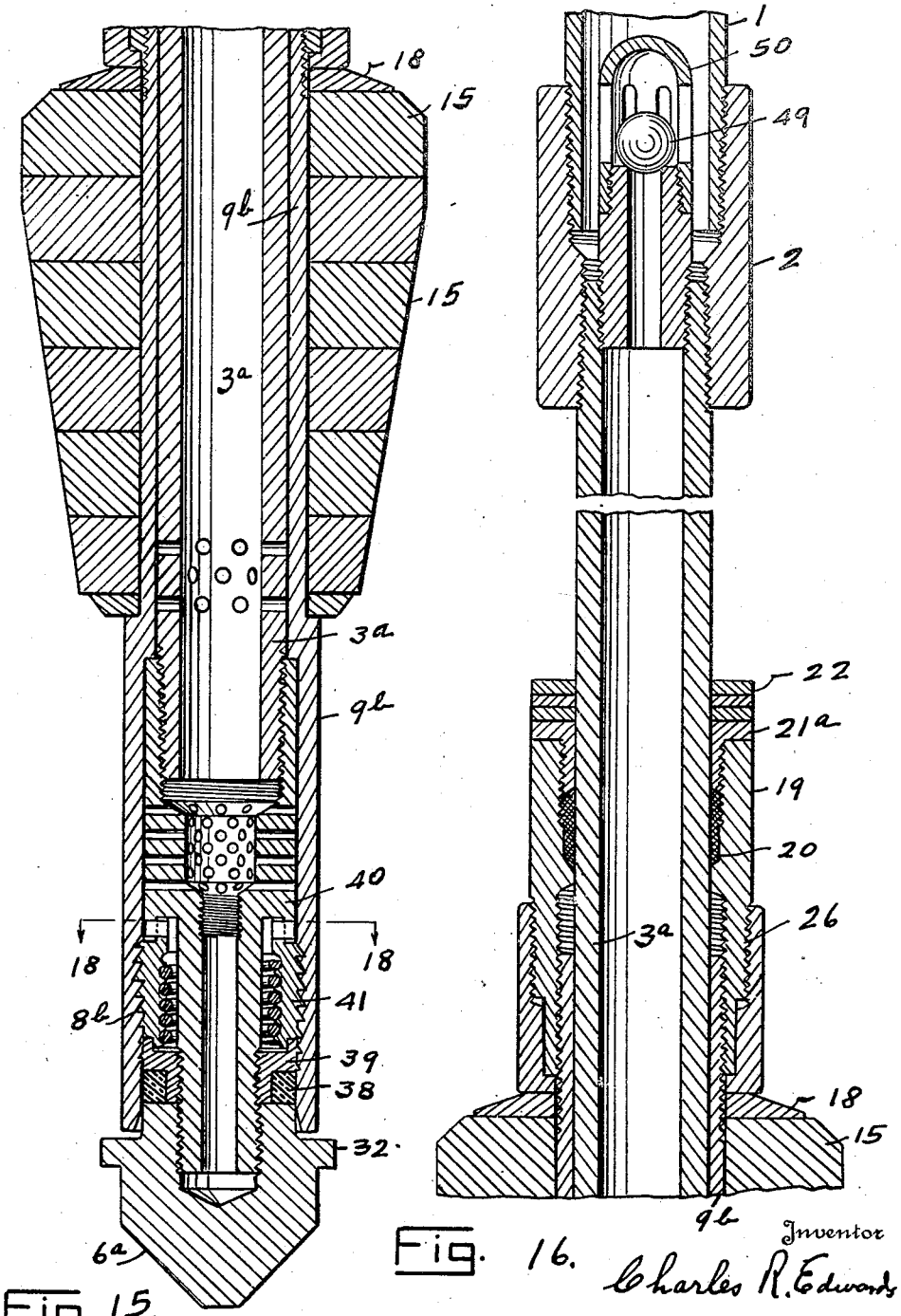
Figures 15 and 16 show vertical sectional views of the upper and lower parts of a modified form of the device, shown in Figures 1 and 2.
Figure 17:
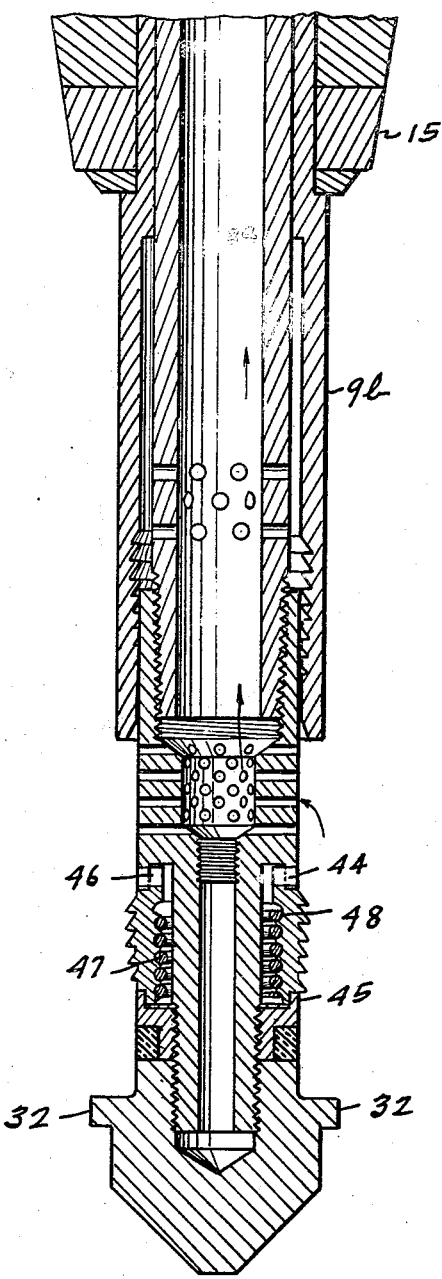
Figure 17 shows a vertical sectional view of the lower end of the device shown in Figures 15 and 16 in the open position.
Figure 18:
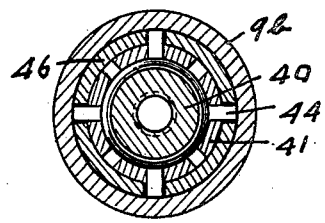
Figure 18 shows a cross sectional view taken on the line 18—18 of Figure 15.
Figure 19:
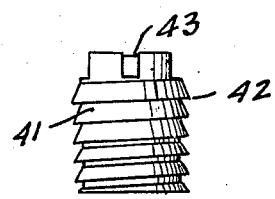
Figure 19 shows a side elevation of a segment of the collapsible ratchet thread retainer shown in Figures 15-17 and 18.

A still further and more radical change not only in the form of thread 8 but in its structural operation is shown at 8b, Figure 15.

Referring to Figures 15, 17, 18 and 19 a collapsible ratchet thread is shown. The sleeve 9b may be formed in one piece with a female buttress thread near its lower end and the plug 6a may be made up with the packing 38 the packing ring 39 and the body 40 to which the stem 3a may be attached.

The collapsible male threaded segmental bolt may be made in four or more arcuate segments 41 with buttress threads 42 on the outer faces thereof. A keyway 43 in which the key 44 loosely rides causes the segments to rotate with the body 40. The segments are retained in place by the upwardly extending flange ring 45 at their lower ends and by the downwardly extending flange 46 (shown in dotted lines in Figure 17), held in operative positions by a resilient member in this instance by the radially compressed spring or crush spring 47. So as to avoid the cocking of the segments 41 during the rotation of the stem 3a the spring seat on the inside of the segments may be formed with spiral or threaded grooves semicircular in cross section as shown at 48.

The advantage of this type of opening mechanism is that it is now and then found that the packer seat, especially in "rat hole" tests, will give away at the very instant that the device is opened and this will cause the taper packer facing and its attached parts, including the sleeve, to plunge downwardly thus closing the device against the flow of the fluid. With this ratchet thread the device is not only instantly closed but automatically locked. This permits forcing the packer down to a new seat without rethreading the stem plug 6 back into the sleeve 9 and also avoids letting the drilling mud into the stem which not only hampers the test but the drilling mud from above by passing down around the packer facing also often damages the walls of the well bore. After the seal or packer 15 has been forced to a new seat the stem 1 is again rotated and the stem again lowered to the open position.

It is obvious that many other forms of the means shown for opening and closing the device can be used but I prefer to lower the tester stem as disclosed in my Patent No. 1,514,585—Testing device for oil wells, so that the perforations or screens in the lower section of the test stem (1 of this application—8 of the above patent) are covered while going in the well,—this, so as to avoid choking and clogging up the perforations or screen before reaching the point to be tested.

I also at this time still prefer to be able to rotate the test stem during the actual testing period, because, in actual practice in wells where the liquid pressure is not excessive or where heavy sticky gumbo and other clogging material such as hard cuttings exist in the lower levels of the well the flow very often is either completely choked off from entering the stem through the perforations or very greatly reduced in quantity so that a true test is impossible even with the perforations covered going in the well. This has repeatedly been proven by stopping the stem from rotating even after the stem with large perforations had been rotated until the fluid had started to flow and then the rotating stopped with the result that the flow will slow down and often stop altogether.

While as described in the patent above referred to the test stem can be turned back into the threaded sleeve, I now still prefer to close the device simply by lifting the stem and depending on the close fit of a plug joint as at 10 in this application or the fit of the stem 8 in the sleeve (see line 51 of the above patent also the drawings of the same) or in extreme cases some other arrangement such as is shown by the packing 38 of this application which is found advisable in the ratchet type thread because of excessive wear caused by the spring forcing the parts together with unusual pressures. In Figure 16 is shown at 49 a check valve and at 50 a valve cage to confine said valve. This may be useful in certain events explained later.

An ordinary back pressure valve, as 12, as is shown in Figures 1, 3 and 6, may be used. While valves of this nature have been in use in casings, screens and drill stems heretofore it is shown here as a part of the tester proper only to point out how it can be installed and is for use only when it is desired to circulate fluid down through the stem for use in such emergencies as threatened "blow outs". But generally blow outs are more likely to occur while "coming out" rather than while "going in" and the test is made while in the hole and if there be such excessive pressure as is likely to cause a blow out usually some sand will be found in the test stem after such a test. At times so much sand will be in the stem as to completely stall the pumps. Since a back pressure valve located directly in the tester may cause a false sense of security therefore I now prefer to supplant or to supplement such a back pressure valve with either the "dump" valve shown in Figures 20 to 22 inclusive or some other form of such a valve that will permit circulation. By placing the dump valve above the point likely to be choked by sand or other material or by using the quadruple valve which, if the pressure in the stratum be excessive, will so choke the flow that little or no sand will enter the tester.

Referring first to the dump valve Figures 20–21 and 22, the numerals 1, 1 refer to sections of the test stem above those in Figure 1, and 2a refers to an ordinary coupling used to join sections of the test stem. There is a valve body 51 with threaded connections as indicated. A two way valve 52 whose hollow stem slidably fits at 53 into the bore 54 of the valve body 51 is yieldingly supported by the coiled helical spring 54' resting on the bottom of the enlarged recess 55 in the valve body 51. A hollow retaining nut 56, is provided and formed with ratched grooves, as indicated, on its inner surface. A valve seat on its lower inside beveled faces keeps the valve 52 confined within the valve body 51. A cup shaped spring ratchet clip 57 with an opening in its bottom and castellated sides whose upper ends are turned out so as to ratchet downward and hold against upward movement, as indicated, may be inserted above the valve 52 and within the nut 56. Passages as at 58 connect the recess 55 to the outside of the valve body 51.

A ball valve may be used as at 59 and if used will separate the pipe into two chambers, one above the other.

The operation of the dump valve may be as follows; the parts may be positioned as in Figure 20 until after the test and if a satisfying sample of the tested stratum flows from the test stem the mud pumps may be started and the valve parts be moved to the position shown in Figure 21 thus establishing circulation and as the ball valve 59 forces the spring clip 57 to ratchet down, the valve 52 will not close after the pump is stopped.

This leaves the passages 58 open and dumps the test stem, above this point as it is withdrawn, back into the well. A pure uncontaminated sample of the test is also withdrawn from the well in the sealed chamber below the dump valve.

If the ball valve 59 is left out of the device circulation might be established downwardly through the back pressure valve if used in the bottom of the tool, and if not used circulation might be established outwardly through the perforations by lowering the stem through the packer, but if a large amount of sand or other clogging material is in the tester so as to obstruct the circulation through the tester proper the pump pressure if sufficient to overcome the spring 54 and other normal resistances would establish circulation out through the passages 58.

If valve 49 is used a sample somewhat contaminated will still be retained above the valve 49 and a pure sample be retained below said valve.

Referring now to Figures 23 to 28 inclusive numerals 1, 1 refer to sections of the test stem and 2b to a specially formed stem coupling which may be of the contour shown in the vertical sections.

Resting, when in normal idle position, on the beveled seat 60 is a hollow perforated trunk valve 61 whose lower end is invertedly castellated as at 62, so as to form passageways. A spool choker 63 of rather small bore is loosely retained within the trunk valve by the perforated trunk valve head 64 which may be attached by threads to the trunk valve 61. A mutilated flange 65, 70 which may be an integral part of the trunk valve 61, supports a coil spring 66.

A nut valve 67 may be attached by threads to the upper solid shank of the trunk valve 61 so as to retain the cage valve 68 in place slidably fitting the inside of smooth bore of collar 2b. A cage valve extension 69 may be threaded to the cage valve 68, this for the purpose of easy assembly.

The cage valve 68 may be retained against its seat 70 with the nut valve 67 by a spring 71 resting on the male flange of nut valve 67 and yieldably supporting a female flange 72 connected to the cage valve 68 as shown.

In this position all passage of fluid through the unit is blocked because of the closure at 70. A hollow nut 73 retains these various parts within certain defined limits permitting limited movements as will now be shown.

In case an excessive pressure as might be occasioned by a very high pressure production sand of say several hundreds of pounds per square inch pressure, be encountered when the test stem is opened to receive a fluid sample from the stratum under investigation, the valve parts take the position shown in Figure 24 compressing both springs until the valve seat 74 is closed and the only passage up through the stem is through the very small choker along the path indicated by the arrows. This passageway is very small compared to the full opening of the stem so the flow of the gas or liquid through the full passageways will be slow and little or no sand will be drawn into the tool.

However if the top of the test stem be closed and full pressure and orifice readings made a very true estimate of the well's capacity can be found.

Figures 26, 27:
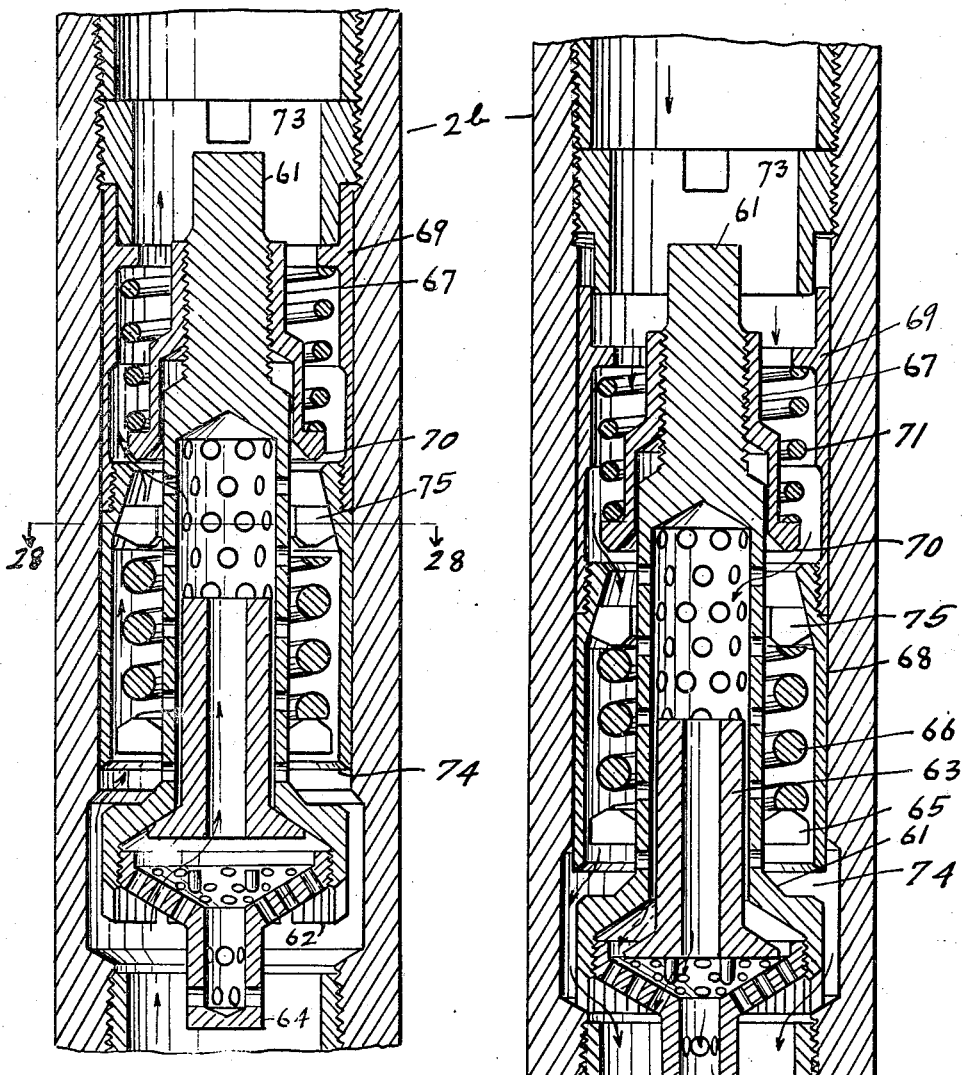
Figure 26 shows a sectional view of the quadruple valve shown in normal test flow position.
Figure 27 is a vertical sectional view of said valve shown in circulating position.
Figure 28:
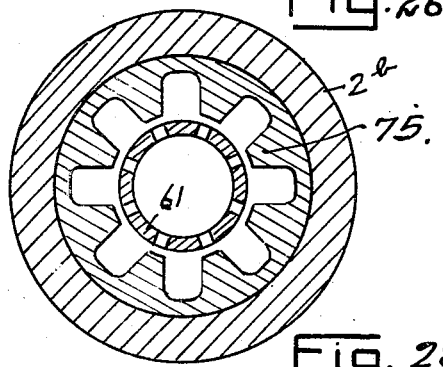
Figure 28 shows a cross sectional view taken on the line 28—28 of Figure 26.

If only a moderate flow and pressure be encountered it will be seen that as indicated by the arrows, Figure 26, large fluid ways are now open because the springs have overcome the pent up fluid pressures and both valves 70 and 74 are open. This permits in deep tests the opportunity to complete a test of low pressure in a very short time and still be prepared for an emergency if the stratum being tested contains high dangerous pressure.

Referring now to Figure 27 the arrows show the direction of fluid and full fluid passageways are shown open when using the pumps for circulation. The spring 71 is shown compressed and the spring 66 holding the cage valve up by the mutilated female flange 75 of the cage valve.

The proportionate sizes and shapes may be changed as desired but the proportionate sizes shown are now thought to be approximately correct for safe testing with fair speed and present equipment where underground conditions may vary from little pressure up to 2000 pounds per square inch or more.

Obviously many mechanical changes can be made in this invention to meet varying conditions to be encountered in different oil fields. Oil fields and localities still exist having caving formations, where no single string tester has ever been used although many tests are being made in the harder formations but owing to the greatly improved technique of well drilling it is now thought that the one string tester will eventually prevail in all oil fields.

It is obviously very evident that many other ways of operating these and other suggested forms of the tester might be explained, such for instance as pumping on the sand by using the stem and valve 49 as the rods and traveling valve and the mudded walls as the standing valve. This would place the stratum to be tested under a vacuum.

It being a well known fact that heavy drilling mud can not be forced appreciably into the ordinary production sand and as the stem is lifted with the valve 49 closed a partial vacuum will be produced below the sealing off point. This will assist to start earth fluid, if present, in the adjacent stratum, to flow into the sealed off portion of the well bore. When the stem is lowered, the heavy mud remaining below the packer will very effectually seal the face of the exposed stratum and will act as the standing valve in an ordinary deep well pump and the next up stroke may draw in some of the lighter earth fluid and so on until a fair sample of the earth fluid is within the tester. But then, another most important part is that usually after the flow is once started it may increase, and positively give proof of a valuable find that otherwise would not be located.

However a variation in a packer form is shown in Figures 29 and 30. In many localities having rotten shale or other easily slacked formations the "rat hole" will break down as indicated at 76 Figure 29. Such conditions are very annoying and cause extra expense and failure to pack off because the "rat hole" seat gives away. To overcome such conditions a combination packer that overcomes such difficulties is shown in Figures 29 and 30. It has been found by experiments and actual trial that if the large part of the taper packer 15 be made somewhat larger than the rat hole 17 and then be superimposed above a collapsible packer as 28a which nearly fills the rat hole 17, when sufficient weight is applied on the top of packer 15 it will be forced down the rat hole 17 crushing and crumbling the walls in, which soon fill the entire space between the two packers 15 and 28a and any further downward movement of the packers cause the wall material to crowd downward on packer 28a causing it to collapse into about the position shown in Figures 29 and 30 and thus create great pressure outward and sufficient friction so as to sustain an enormous load beside making a most effective seal. Packer 28 may be incorporated into the tester by interposing a coupling 77 and a nipple 78 between the sleeve 9a and lower coupling 9, Figure 1. It has also been found advisable to use a light soft steel cup 79 in some instances in connection with the packers. This cup being of rather soft tough material is made strong enough to support and to retain the ends of a packer under all normal testing conditions but light enough so that if a boulder or other obstruction be encountered while coming out of the hole the cup will bend and crush and thus pass the obstructions. This cup or in some instances just a thin plate as at 18 is a valuable safety feature which together with the easily torn up packers permits much more certain withdrawal of the tester after the test is complete.

While I have shown what I now consider to be the preferred forms of the invention it will be readily obvious from the foregoing that other forms of the device may be readily produced by those skilled in the art, within the principle of the invention. It is believed that the forms of the invention herein described constitute, in a general way important improvements and valuable additions to the art as disclosed in my former patent above referred to and I hereby reserve and desire to retain the right to make such modifications, substitutions and changes as may be found desirable within the principle of the invention disclosed.

What I claim is:

1. A method of testing the productivity of a formation encountered in a well containing drilling fluid, which includes lowering an empty string of pipe into the well through the drilling fluid to adjacent the formation, the pipe carrying a packer and having a valved inlet at its lower end which is closed while the pipe is being lowered, setting the packer above the formation to seal off the drilling fluid from the formation, opening the valved inlet after the packer is set to permit cognate fluid from the formation to enter the pipe, closing the valved inlet against the entrance of fluid from the well by movement of the pipe, raising the pipe so closed to remove an entrapped sample and stripping off the packer to assist in removing the pipe from the well.

2. A method of testing the productivity of a formation encountered in a well containing drilling fluid involving the insertion of only a single string of pipe into the well to make a test, which includes lowering a test string into the well through the drilling fluid with a packer carried by the string and a valve inlet at the lower end of the string closed against the entrance of fluid from the well, setting the packer above the formation and opening the valve to permit cognate fluid from the formation to enter the inlet, rotating the string while taking the sample, closing the valve to prevent the subsequent entrance of fluid from the well through the inlet and releasing the packer by stripping off the same from said string, and raising the test string with the inlet closed against entrance of fluid from the well to remove an entrapped sample.

3. Apparatus for testing a well comprising a string of pipe to be lowered into a well having an inlet at its lower end and carrying a packer adapted to be positively pressed against the walls of the formation to seal off the same above the inlet, and a valve for the inlet positively controlled by movement of the pipe to open and close the inlet while the packer is seated and means to automatically close and relock the inlet in closed position in case the packer seat fails.

4. Apparatus for testing a well comprising a string of pipe to be lowered into the well, a packer carried by the pipe said packer adapted to be positively pressed against the walls of the formation to seal off the same and means at the lower end of the pipe to receive a sample from the well including an inlet and a valve for controlling the inlet, the valve being positively controlled by movement of the pipe to open and close the inlet while the packer is seated and a variable flow be an automatically controlled by the flow of fluid therethrough.

5. Apparatus for testing a well containing drilling fluid, which includes an empty string of pipe to be lowered in the well to adjacent the formation to be tested, means at the lower end of the pipe to receive a sample from the formation including an inlet opening into the pipe and a valve for controlling the inlet, and means carried by the pipe for sealing the well above the inlet, said means consisting of a packing adapted to be positively pressed against the walls of the formation to seal off the same, the valve being positively controlled by movement of the pipe, and means for retaining the entrapped sample and permitting circulation to a point above the packer said means including a passageway through the pipe.

6. Apparatus for testing a formation encountered in a well containing drilling fluid, which includes a single string of pipe to be lowered into the well to adjacent the formation to be tested, a valved inlet at the lower end of the pipe positively controlled from the top of the well by movement of the pipe and a packer carried by the pipe above the inlet, said packer being adapted to be positively pressed against the wall of the formation to seal off the same, and means for determining the quantity of production in a mud filled well.

7. Apparatus for testing the productivity of a formation encountered in a well containing drilling fluid, which includes an empty string of pipe to be lowered into the well to adjacent the formation to be tested, a packer carried by the pipe, means at the lower end of the pipe to receive a sample from the formation including an inlet opening into the pipe and a valve structure for controlling the inlet, the valve structure including a plurality of relatively movable parts, one of which is secured to the pipe and another of which is connected to the packer, said apparatus having a valved passageway permitting movement of the drilling fluid axially of the well bore.

8. Apparatus for testing the productivity of a formation encountered in a well containing drilling fluid, which includes a single empty string of pipe to be lowered into the well to adjacent the formation to be tested, means lowered into the well by said string of pipe for sealing off the drilling fluid from the formation to be tested said sealing means being adapted to be positively pressed against the walls of the formation to seal off the same, means at the lower end of said string of pipe to receive a sample from the formation including an inlet opening into said pipe and a valve structure for controlling the inlet, said valve structure including a part connected to said sealing means and a part connected to said pipe, said sealing means being provided with a removable facing.

9. Apparatus for testing the productivity of a formation encountered in a well containing drilling fluid, comprising a single empty string of pipe to be lowered into the well through the drilling fluid to adjacent the formation to be tested, a packer lowered into the well by said string of pipe for sealing off the drilling fluid from the formation to be tested said packer adapted to be positively pressed against the walls of the formation to seal off the same, means at the lower end of said string of pipe to receive fluid from said formation including an inlet opening into said pipe below said packer and a valve structure for controlling the inlet, said valve structure having a relatively stationary part connected to the packer and a relatively movable part connected to the pipe means to assist in the removal of the apparatus from the well, such means including a further means to permit movement of the drilling fluid through a passageway in the apparatus.

10. Apparatus for testing the productivity of a formation encountered in a well containing drilling fluid, comprising a single empty string of pipe to be lowered into the well through the drilling fluid to adjacent the formation to be tested, a packer carried by the pipe for sealing off the well above the formation an inlet below the packer opening into the pipe said packer adapted to be positively pressed against the walls of the formation to seal off the same, and a valve for the inlet, the setting of the packer and the operation of the valve being positively controlled by movement of the pipe, and a variable flow bean automatically controlled by the flow of the fluid therethrough.

11. Apparatus for testing a well containing drilling fluid, comprising a single string of pipe to be lowered into the well through the drilling fluid, said pipe being closed against the entrance of the drilling fluid, means at the lower end of the pipe for receiving a sample including an inlet opening into the pipe, means carried by the pipe for sealing the well above the inlet said sealing means adapted to be positively pressed against the walls of the formation to seal off the same, and a valve for the inlet that may be positively opened and closed by movement of the pipe while the well is sealed above the inlet, and said packer comprising removable laminations of varying diameters.

12. An apparatus for testing the productivity of a formation in a well containing drilling fluid, comprising a string of pipe to be lowered into the well through the drilling fluid to adjacent the formation to receive a fluid sample therefrom and to be raised out of the well to remove the entrapped sample, said pipe being closed against the flow of the drilling fluid as the pipe is lowered into the well, a packer carried by the pipe as the pipe is lowered into the well and adapted to be seated by manipulation of the pipe to seal off the well above the formation said packer adapted to be positively pressed against the walls of the formation to seal off the same, an inlet to the pipe communicating with the well below the point at which the packer seals off the well, and means for controlling the inlet to permit fluid from the formation to enter the pipe while the packer is set and to prevent fluid from entering the pipe after the packer is released and the pipe is being raised out of the well, and means for establishing a partial vacuum, said means being operable by movement of the pipe.

13. Apparatus for testing a well comprising a string of pipe to be lowered into a well having an inlet at its lower end and carrying a packing for sealing the well above the inlet, and a valve for the inlet positively controlled by movement of the pipe to open and close the inlet while the packer is seated and means present to permit stripping off said packer to allow removal of said string.

14. Apparatus for testing a well comprising a string of pipe to be lowered into the well, a packer carried by the pipe and means at the lower end of the pipe to receive a sample from the well including an inlet and a valve for controlling the inlet, the valve being adapted to open and close the inlet while the packer is seated and a means above said inlet to act as an orifice gauge for use in testing the rate of flow therethrough.

15. Apparatus for testing a well containing drilling fluid, which includes an empty string of pipe to be lowered in the well to adjacent the formation to be tested, means at the lower end of the pipe to receive a sample from the formation including an inlet opening into the pipe and a valve for controlling the inlet, and means carried by the pipe for sealing the well above the inlet, the valve being positively controlled by movement of the pipe and a means above said inlet to act as an orifice gauge for use in testing the rate of flow therethrough.

16. Apparatus for testing the productivity of a formation encountered in a well containing drilling fluid, which includes a single empty string of pipe to be lowered into the well to adjacent the formation to be tested, means lowered into the well by said string of pipe for sealing off the drilling fluid from the formation to be tested, means in said string of pipe to receive a sample from the formation including an inlet opening into said pipe and a valve structure for controlling the inlet, said string of pipe having means whereby the rate of flow may be gauged and said means including a choke.

17. Apparatus for testing the productivity of a formation encountered in a well containing drilling fluid, comprising a single empty string of pipe to be lowered into the well through the drilling fluid to adjacent the formation to be tested, a packer lowered into the well by said string of pipe for sealing off the drilling fluid from the formation to be tested, means at the lower end of said string of pipe to receive fluid from said formation including an inlet opening into said pipe below said packer and a valve structure for controlling the inlet, said valve structure having a relatively stationary part connected to the packer and a relatively movable part connected to the pipe, said string of pipe having means whereby the rate of flow may be gauged and said means including a restricted passageway.

18. Apparatus for testing the productivity of a formation encountered in a well containing drilling fluid, comprising a single empty string of pipe to be lowered into the wall through the drilling fluid to adjacent the formation to be tested, a packer carried by the pipe for sealing off the well above the formation an inlet below the packer opening into the pipe, and a valve for the inlet, the setting of the packer and the operation of the valve being positively controlled by movement of the pipe, and means permitting the pipe to be rotated while taking the sample.

19. Apparatus for testing a well containing drilling fluid, comprising a single string of pipe to be lowered into the well through the drilling fluid, said pipe being closed against the entrance of the drilling fluid, means at the lower end of the pipe for receiving a sample including an inlet opening into the pipe, means carried by the pipe for sealing the well above the inlet, and a valve for the inlet that may be positively opened and closed by movement of the pipe while the well is sealed above the inlet, said apparatus having a valved passageway therein permitting movement of the drilling fluid axially of the well bore.

20. An apparatus for testing the productivity of a formation in a well containing drilling fluid, comprising a string of pipe to be lowered into the well through the drilling fluid to adjacent the formation to receive a fluid sample therefrom and to be raised out of the well to remove the entrapped sample, said pipe being closed against the flow of the drilling fluid as the pipe is lowered into the well, a packer carried by the pipe as the pipe is lowered into the well and adapted to be seated by manipulation of the pipe to seal off the well above the formation, an inlet to the pipe communicating with the well below the point at which the packer seals off the well, and means for controlling the inlet to permit fluid from the formation to enter the pipe while the packer is set and to prevent fluid from entering the pipe after the packer is released and the pipe is being raised out of the well, said apparatus having a valved passageway therein permitting movement of the drilling fluid axially of the well bore.

21. A method of testing the productivity of a formation in a well containing drilling fluid, which includes lowering a sample chamber carrying a sealing means into the well through the drilling fluid to the formation to be tested, the chamber being closed against the entrance of fluid from the well during the lowering operation, sealing off the well above the formation to exclude the drilling fluid from the formation, opening the chamber to permit cognate fluid from the formation to enter the chamber, closing the chamber against the entrance of fluid from the well, permitting the drilling fluid to move axially of the well bore by opening a passageway to assist in the release of the seal and the removal of the chamber and then releasing the seal and removing the chamber.

22. A method of testing the productivity of the formation in a well containing drilling fluid, which includes lowering a sample chamber into the well through the drilling fluid to the formation to be tested, the chamber being closed against the entrance of fluid into the chamber from the well bore during the lowering operation, sealing off the well above the said formation to exclude the drilling fluid, above from the formation, opening said chamber to permit a fluid from said formation to enter the said chamber closing said chamber against the entrance of fluid from the well, releasing the seal by stripping off same and leaving it in the well and removing said chamber, so closed against the entrance of fluid from the well, to withdraw an entrapped sample of the fluid from below the point at which the well was sealed off.

23. A method of testing the productivity of a formation encountered in a well containing drilling fluid, which includes lowering a string of pipe into the well through the drilling fluid to adjacent the formation, said string of pipe being closed against the entrance of fluid from the well during the lowering operation, the pipe carrying a packer and having a valved inlet at its lower end which is closed while the pipe is being lowered, setting the packer above the formation to seal off the drilling fluid from the formation, opening the valved inlet after the packer is set to permit the fluid from the formation to enter the pipe or if fluid does not enter in sufficient quantity establishing at least a partial vacuum in the well by moving said pipe, closing the valved inlet against the entrance of fluid from the well by movement of the pipe, raising the pipe so closed to remove an entrapped sample and the packer from the well.

24. The method of testing the productivity of the formation in a well containing drilling fluid involving the insertion of only a single string of pipe into the well, which includes lowering a test string into the well through the drilling fluid with a packer carried by the string and a valved inlet at the lower end of the string closed against the entrance of fluid from the well, setting the packer above the formation and opening the valve to permit fluid from the formation to enter the inlet or if the fluid does not enter in sufficient quantity establishing a partial vacuum in the well by movement of said pipe, closing the valve to prevent the subsequent entrance of fluid, from the well, through the inlet, and releasing the packer and raising the test string with the inlet closed against the entrance of fluid from the well to remove the entrapped sample.

25. The method of testing the productivity of a formation in a well containing drilling fluid, which includes lowering a sample chamber into the well through the drilling fluid to the formation to be tested, the chamber being closed against the entrance of fluid from the well during the lowering operation, sealing off the well above the said formation to exclude the drilling fluid above from the formation, opening said chamber to permit a fluid from said formation to enter said chamber assisting the entrance of fluid into said chamber by agitating the fluid in the well adjacent said formation to assist the entrance of fluid into said chamber, closing the chamber against the entrance of fluid from the well, releasing the seal and removing said chamber, so closed against the entrance of fluid from the well, to withdraw an entrapped sample of fluid from below the point at which the well was sealed off.

26. A method of testing the productivity of a formation in a well containing a drilling fluid, which includes lowering a string of pipe into the well through the drilling fluid to the formation, the pipe carrying a packer and having a valved inlet at its lower end which is closed while the pipe is being lowered, setting the packer above the formation to seal off the drilling fluid from the formation, opening the valved inlet after the packer is set to permit a fluid from the formation to enter the pipe, closing the valved inlet against the entrance of fluid from the well by movement of the pipe stripping off said packer to assist in the removal of the pipe from the well, raising the pipe so closed to remove an entrapped sample from the well.

27. A method of testing the productivity of a formation in a well containing drilling fluid, involving the insertion only of a single string of pipe into the well to make a test, which includes lowering a test string into the well through the drilling fluid with a packer carried by the string an a valved inlet at the lower end of the string closed against the entrance of fluid from the well, setting a packer above the formation and opening the valve to permit fluid from the formation to enter the inlet, agitating the fluid in the well by movement of said pipe adjacent said formation, to maintain the inlet open while taking the sample closing the valve against the subsequent entrance of fluid from the well through the inlet and releasing the packer and raising the test string with the inlet closed against the entrance of fluid from the well to remove an entrapped sample and the packer.

28. The method of testing the productivity of a formation in a well containing drilling fluid, which includes lowering a sample chamber into the well through the drilling fluid to the formation to be tested, the chamber being closed against the entrance of fluid from the well during the lowering operation, said chamber having a choker to restrain the flow of fluid upwardly therethrough, sealing off the well above said formation to exclude the drilling fluid above from the formation, opening said chamber to permit a fluid from said formation to enter the said chamber restricting the flow into said chamber, closing said chamber against the entrance of fluid from the well, releasing the seal and removing said chamber so closed against the entrance of fluid from the well, to withdraw an entrapped sample of the fluid from below the point at which the well was sealed off.

29. The method of testing the productivity of a formation in a well containing drilling fluid, which includes lowering an empty string of pipe into the well through the drilling fluid to adjacent the formation, the pipe carrying a packer and having a valve inlet at its lower end which is closed, while the pipe is being lowered, setting the packer above the formation to seal off the drilling fluid from the formation, opening the valved inlet after the packer is set to permit a fluid from the formation to enter the pipe restricting the flow of fluid above said inlet by passing the same through an orifice, closing the valved inlet against the entrance of fluid from well by movement of the pipe, raising the pipe so closed to remove the entrapped sample from the well.

30. The method of testing the productivity of a formation in a well containing drilling fluid which includes lowering a sample chamber into the well through the drilling fluid to the formation to be tested, the chamber being closed against the entrance of fluid from the well during the lowering operation, sealing off the well above said formation to exclude the drilling fluid above from the formation, opening said chamber to permit a fluid from said formation to enter the said chamber, restricting the flow of fluid above said inlet by passing the same through an orifice of predetermined length and width, thus determining the quantity of the flow of fluid.

31. The method of testing the productivity of a formation in a well containing drilling fluid which includes lowering an empty string of pipe into the well through the drilling fluid to adjacent the formation, the pipe carrying a packer and having a valved inlet at its lower end which is closed while the pipe is being lowered seating the packer above the formation to seal off the drilling fluid from the formation, opening the valved inlet after the packer is set to permit a fluid from the formation to enter the pipe, moving the drilling fluid axially of the well bore above the packer and outside of said pipe closing the valve inlet against the entrance of fluid from the well by the movement of the pipe, then opening a passageway terminating in the space outside of said pipe and above said packer raising the pipe so closed to remove the entrapped sample from the well.

32. A method of testing the productivity of a formation in a well containing drilling fluid, which includes lowering a sample chamber into the well through the drilling fluid to the formation to be tested, the chamber being closed against the entrance of fluid from the well during the lowering operation, sealing off the well above the formation to exclude the drilling fluid from the formation, opening the chamber to permit the fluid from the formation to enter the chamber, closing the chamber against the entrance of fluid from the well, moving the drilling fluid axially of the well bore above the sealing point and outside of said chamber, releasing the seal and removing the chamber so closed to withdraw an entrapped sample of fluid from below the point at which the well was sealed off.

33. A method of testing the productivity of a formation in a well containing drilling fluid, which includes lowering an empty string of pipe into the well through the drilling fluid to adjacent the formation, the pipe carrying a packer and having a valved inlet at its lower end which is closed while the pipe is being lowered, setting the packer above the formation to seal off the drilling fluid from the formation, opening the valved inlet after the packer is set to permit the fluid from the formation to enter the pipe, closing the valved inlet against the entrance of fluid from the well by movement of the pipe, then separating said pipe into a plurality of chambers, emptying the contents of one of said chambers back into the well, raising the pipe so closed to remove an entrapped sample from the well.

34. Apparatus for testing a well comprising a string of pipe to be lowered into the well and having a valved outlet for permitting the exit of fluid from the pipe into the well bore, a packer carried by the pipe, means at the lower end of the pipe to receive a sample from the well means operable by movement of said string to establish a partial vacuum in the well; said first-named means including an inlet and a valve for controlling the inlet, the inlet valve being positioned below the packer and positively controlled by movement of the pipe to open and close the inlet while the packer is seated.

35. In apparatus for testing the fluid content of a formation in a well, a closed string of pipe adapted to be lowered into the well, spaced packers on the string, means for entrapping and removing a sample in the string including a fluid inlet and a valve for controlling said inlet.

36. In apparatus for testing the fluid content of a formation in a well, a closed string of pipe adapted to be lowered into the well, spaced packers on the string, means for entrapping and removing a sample in the string including a fluid inlet and a valve for controlling said inlet, and pliable means for retaining the packers on said string of pipe.

37. An apparatus for testing the productivity of a formation in a well containing drilling fluid, comprising a string of pipe to be lowered into the well through the drilling fluid to adjacent the formation to receive a fluid sample therefrom and to be raised out of the well, said pipe being closed against the flow of the drilling fluid as the pipe is lowered into the well, a packer carried by the pipe as the pipe is lowered into the well and adapted to be seated by the manipulation of the pipe to seal off the well above the formation said packer adapted to be positively pressed against the walls in the well to seal off the drilling fluid above the packer from the formation below the point at which the packer seals off the well, and means for controlling the inlet to permit fluid from the formation to enter the pipe while the packer is set and to prevent fluid from entering the pipe after the packer is released and the pipe is being raised out of the well said apparatus having a valved passageway permitting movement of the drilling fluid axially of the well bore.

CHARLES R. EDWARDS.